United States Patent
Miyata (10) Patent No.: US 8,051,434 B2
(45) Date of Patent: *Nov. 1, 2011

(54) DATA PROCESSING DEVICE FOR RENAMING VIRTUAL DEVICE

(75) Inventor: Yuji Miyata, Kitanagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1190 days.

This patent is subject to a terminal disclaimer.

(21) Appl. No.: 11/627,020

(22) Filed: Jan. 25, 2007

(65) Prior Publication Data

US 2007/0177198 A1    Aug. 2, 2007

(30) Foreign Application Priority Data

Jan. 30, 2006   (JP) ................... 2006-021202

(51) Int. Cl.
*G06F 9/44* (2006.01)
*G06F 15/00* (2006.01)

(52) U.S. Cl. .......... 719/321; 719/327; 358/1.15

(58) Field of Classification Search ........ 719/310, 719/321, 327; 358/1.15
See application file for complete search history.

(56) References Cited

U.S. PATENT DOCUMENTS

| | | | |
|---|---|---|---|
| 5,353,399 A | | 10/1994 | Kuwamoto |
| 5,845,078 A * | | 12/1998 | Tezuka et al. ............... 709/222 |
| 5,996,029 A * | | 11/1999 | Sugiyama et al. ............ 710/15 |
| 6,177,934 B1 * | | 1/2001 | Sugiura et al. ............... 715/748 |
| 6,184,998 B1 * | | 2/2001 | Tebeka ......................... 358/1.15 |
| 6,473,811 B1 * | | 10/2002 | Onsen ........................... 710/15 |
| 6,798,530 B1 | | 9/2004 | Buckley et al. |
| 7,231,435 B2 * | | 6/2007 | Ohta ............................. 709/221 |
| 7,287,253 B2 | | 10/2007 | Yamamura et al. |
| 7,310,690 B2 * | | 12/2007 | Yokota ............................ 710/9 |
| 7,779,168 B2 | | 8/2010 | Yamamura et al. |
| 2003/0066027 A1 * | | 4/2003 | Nakagiri ....................... 715/500 |
| 2004/0051743 A1 | | 3/2004 | Gonsho |
| 2004/0227973 A1 | | 11/2004 | Taylor |
| 2004/0230966 A1 | | 11/2004 | Morris et al. |
| 2005/0206938 A1 | | 9/2005 | Ono |
| 2006/0200644 A1 | | 9/2006 | Asada et al. |
| 2006/0206903 A1 | | 9/2006 | Lawrence et al. |

(Continued)

FOREIGN PATENT DOCUMENTS

JP    7152507    6/1995

(Continued)

OTHER PUBLICATIONS

Decision of Rejection mailed Oct. 19, 2010 in Japanese Application No. 2006-021202 and English translation thereof.

(Continued)

*Primary Examiner* — Van Nguyen
(74) *Attorney, Agent, or Firm* — Banner & Witcoff, Ltd (57) ABSTRACT

A data processing device includes a registering unit, a display unit, a status acquiring unit, and a virtual device renaming unit. The registering unit registers a plurality of communicable printers as a plurality of virtual devices. The display unit displays a plurality of virtual device names for the plurality of virtual devices. The status acquiring unit acquires a status of each of the plurality of virtual devices. The virtual device renaming unit changes at least one of the virtual device names for the plurality of virtual devices to a device name representing the status of a corresponding virtual device acquired by the status acquiring unit.

12 Claims, 4 Drawing Sheets

| No. | ORIGINAL VIRTUAL DEVICE NAME | MODIFIED VIRTUAL DEVICE STATUS |
|---|---|---|
| 1 | XXXX1500 Printer | 00 XXXX1500 Printer |
| 2 | YYYY4800CX | 90 OUT-OF-PAPER – YYYY4800CX |
| 3 | ZZZZ 190SF | 00 ZZZZ 190SF |
| 4 | XXXX1500 Printer (copy 2) | 93 OFF-LINE – XXXX1500 Printer (copy 2) |
| 5 | YYYY4900CX | 51 TONER LOW – YYYY4900CX |

U.S. PATENT DOCUMENTS

| | | |
|---|---|---|
| 2007/0177178 A1 | 8/2007 | Miyata |
| 2007/0177202 A1 | 8/2007 | Miyata |

FOREIGN PATENT DOCUMENTS

| | | |
|---|---|---|
| JP | 9-006557 A | 1/1997 |
| JP | 9-006558 A | 1/1997 |
| JP | 2000076032 | 3/2000 |
| JP | 2000-293336 A | 10/2000 |
| JP | 2001-056756 A | 2/2001 |
| JP | 2001-282661 A | 10/2001 |
| JP | 2001-306279 A | 11/2001 |
| JP | 2003271286 | 9/2003 |
| JP | 2004110127 | 4/2004 |
| JP | 2005085132 | 3/2005 |
| JP | 2005-267544 A | 9/2005 |
| JP | 2006-011831 A | 1/2006 |
| JP | 2007-200253 A | 8/2007 |
| JP | 2007-200255 A | 8/2007 |

OTHER PUBLICATIONS

EP Search Report dtd Feb. 19, 2008, EP App. 07250309-7.
JP Office Action dtd Mar. 23, 2010, JP Appln. 2006-021202, English translation.
JP Office Action dated Mar. 16, 2010, Japanese Appln. No. 2006-021203, English translation.
Extended European Search Report dated Mar. 4, 2008, EP Appln. No. 07250297.4.

* cited by examiner

| No. | ORIGINAL VIRTUAL DEVICE NAME | VIRTUAL DEVICE STATUS |
|---|---|---|
| 1 | XXXX1500 Printer | NORMAL |
| 2 | YYYY4800CX | OUT-OF-PAPER |
| 3 | ZZZZ 190sf | NORMAL |
| 4 | XXXX1500 Printer (copy 2) | OFF-LINE |
| 5 | YYYY4900CX | TONER LOW |

FIG.4

| STATUS | SYMBOL ADDED TO HEAD OF NAME |
|---|---|
| NORMAL | 00 |
| PAPER LOW | 50 PAPER LOW |
| TONER LOW | 51 TONER LOW |
| OUT-OF-PAPER | 90 OUT-OF-PAPER |
| OUT-OF-TONER | 91 OUT-OF-TONER |
| POWER OFF | 92 POWER OFF |
| OFF-LINE | 93 OFF-LINE |

FIG.5

| No. | ORIGINAL VIRTUAL DEVICE NAME | MODIFIED VIRTUAL DEVICE STATUS |
|---|---|---|
| 1 | XXXX1500 Printer | 00 XXXX1500 Printer |
| 2 | YYYY4800CX | 90 OUT-OF-PAPER - YYYY4800CX |
| 3 | ZZZZ 190SF | 00 ZZZZ 190SF |
| 4 | XXXX1500 Printer (copy 2) | 93 OFF-LINE - XXXX1500 Printer (copy 2) |
| 5 | YYYY4900CX | 51 TONER LOW - YYYY4900CX |

DATA PROCESSING DEVICE FOR RENAMING VIRTUAL DEVICE

CROSS REFERENCE TO RELATED APPLICATIONS

This application claims priority from Japanese Patent Application No. 2006-21202 filed Jan. 30, 2006. The entire content of priority application is incorporated herein by reference.

TECHNICAL FIELD

The present invention relates to a data processing device for renaming virtual device and a computer readable medium containing a virtual device renaming program that enables the user to select one of a plurality of virtual devices registered in the data processing device more easily.

BACKGROUND

In recent years, personal computers and other data processing devices have been used in an environment allowing access to a plurality of printers. For example, a system that has a plurality of data processing devices connected to a plurality of printers via a network may be set up so that each of the data processing devices can access each of the printers. With this system, virtual devices corresponding to the printers are registered in each data processing device so that the user can specify which of the printers is the output destination.

By registering a plurality of virtual devices in the data processing device, the user of the data processing device can select a virtual device as the output destination from a list of the virtual device names. However, the user cannot print on a printer corresponding to the virtual device selected from the list if the power to the corresponding printer is not turned on or if the corresponding printer is out of paper, for example.

When this happens, the user can select another virtual device from the list to print the data on a different printer, but this method requires the user to perform extra operations in order to change the output destination. Further, the printer corresponding to the new output destination may also be inoperable due to the power not being turned on or the printer being out of paper, forcing the user to perform still more annoying operations.

One data processing device disclosed in Japanese Patent Application Publication No. 2005-85132 addresses this problem by acquiring status data from the printers and switching the default printer based on the acquired status data. This data processing device can switch the default printer to a different printer if the current default is set to a printer that is not powered on or is out of paper, thereby reducing the potential for problems in printing to the default printer.

SUMMARY

However, when the user wishes to use a virtual device other than the virtual device set as the default with the data processing device according to Japanese Patent Application Publication No. 2005-85132, the user must select the desired virtual device in order to determine whether the printer corresponding to this virtual device is in an operable state.

A particular problem occurs when the user does not care which of the virtual devices is selected as the output destination. In this case, the user would obviously prefer that the selected virtual device is in a state capable of printing. However, conventional data processing devices have not been able to determine whether the virtual device is in a state capable of printing until the user selects one of the virtual devices.

Accordingly, when there are one or more virtual devices other than the default device that can be set as the output destination and the virtual devices include devices in a state not capable of printing, the user must resort to selecting the virtual devices sequentially one at a time in order to find a virtual device in a state capable of printing.

In view of the foregoing, it is an object of the present invention to provide a data processing device for renaming virtual device and a computer readable medium containing a virtual device renaming program that aids the user of a data processing device in selecting a virtual device in a state capable of printing when a plurality of virtual devices is registered in the data processing device.

To achieve the above and other objects, one aspect of the invention provides a data processing device including a registering unit, a display unit, a status acquiring unit, and a virtual device renaming unit. The registering unit registers a plurality of communicable printers as a plurality of virtual devices. The display unit displays a plurality of virtual device names for the plurality of virtual devices. The status acquiring unit acquires a status of each of the plurality of virtual devices. The virtual device renaming unit changes at least one of the virtual device names for the plurality of virtual devices to a device name representing the status of a corresponding virtual device acquired by the status acquiring unit.

In another aspect of the invention, there is provided a computer readable medium containing a virtual device renaming program for instructing a data processing device capable of registering a plurality of communicable printers as a plurality of virtual devices, displaying a plurality of device names fox the plurality of virtual devices, prompting a user to select one of the plurality of virtual devices, and transmitting print data to a printer corresponding to a selected virtual device. The virtual device renaming program includes acquiring a status of each of the plurality of virtual devices; and renaming at least one of the virtual device names for the plurality of virtual devices to a device name representing the status of a corresponding virtual device acquired in the acquiring step.

DETAILED DESCRIPTION

Next, a data processing device for renaming virtual device and a computer readable medium containing a virtual device renaming program according to a preferred embodiment of the present invention will be described.

[Overall Structure of the System]

Figure 1:
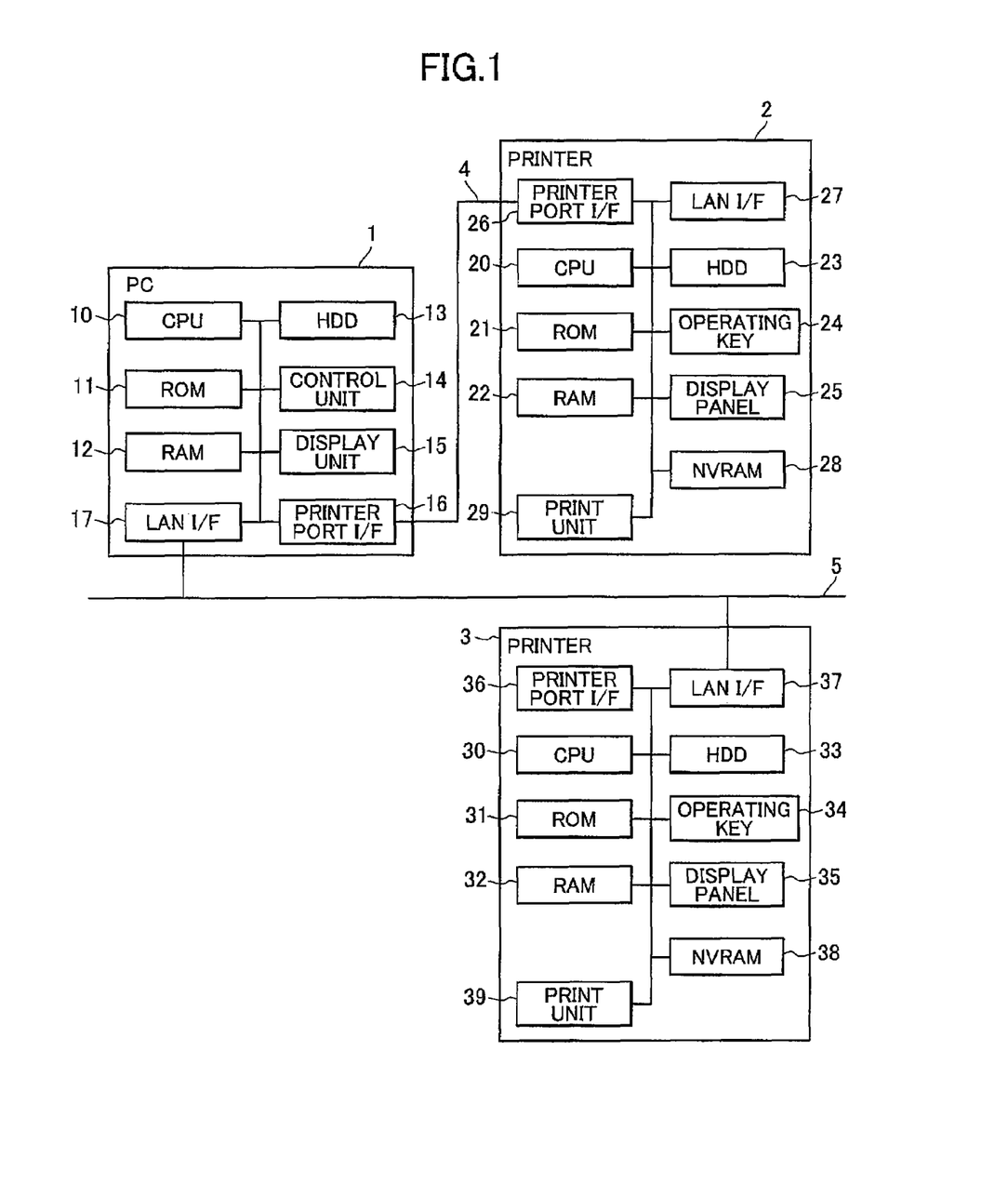
FIG. 1 is a block diagram showing the hardware structure of a system including a personal computer for executing a virtual device renaming program according to a preferred embodiment of the present invention, and printers.

FIG. 1 is a block diagram showing the general structure of a system including a personal computer 1. The personal computer 1 functions as a data processing device for executing processes corresponding to the virtual device renaming program according to the preferred embodiment.

The personal computer 1 can communicate with a plurality of printers. FIG. 1 shows two printers 2 and 3 that are connected to the personal computer 1 in different ways. Specifically, the printer 2 is directly connected to the personal computer 1 through a printer cable 4 as a local printer, while the printer 3 communicates with the personal computer 1 through a LAN cable 5 as a network printer.

The personal computer 1 can also communicate with printers other than the printers 2 and 3. However, such printers are not shown in FIG. 1 since the connection configurations are identical to those used for the printers 2 and 3. In a process for renaming virtual device described later, the personal computer 1 will be capable of using five printers, with five virtual devices corresponding to five printers registered in the personal computer 1.

As shown in FIG. 1, the personal computer 1 in the system described above includes a CPU 10, a ROM 11, a RAM 12, a hard disk drive 13, a control unit 14, a display unit 15, a printer port interface 16, and a LAN (local area network) interface 17.

The CPU 10 executes various calculations and processes for controlling components in the personal computer 1 according to programs stored in the ROM 11 and RAM 12. The CPU 10 also executes a process for renaming virtual device described later.

The ROM 11 is a storage device capable of saving stored contents when a power switch of the personal computer 1 is turned off. The ROM 11 stores BIOS (Basic Input/Output System) data and other read-only data that is normally not updated.

The RAM 12 is a storage device employed as a main memory or the like directly accessed by the CPU 10. Operating system, applications programs, and the like are read into the RAM 12 from the hard disk drive 13. The RAM 12 also stores results of computations performed by the CPU 10 and data read from the hard disk drive 13. When executing the process to rename virtual device described later, the CPU 10 reads a virtual device renaming program into the RAM 12 from the hard disk drive 13 and executes the process for renaming virtual device based on the virtual device renaming program stored in the RAM 12.

The hard disk drive 13 functions to save the operating system, various application programs, and various data files, as well as the virtual device renaming program mentioned above.

The control unit 14 is an input device for inputting various user instructions. For example, the control unit 14 is configured of a keyboard and various pointing devices, such as a mouse.

The display unit 15 is an output device for presenting various data to the user. For example, the display unit 15 may be configured of a liquid crystal display capable of displaying color images.

The printer port interface 16 is an interface capable of connecting with a printer. For example, the printer port interface 16 may be configured of a serial interface such as a USB (Universal Serial Bus) interface, or a parallel interface such as an IEEE 1284 interface.

The LAN interface 17 is an interface for communicating with printers or other peripheral devices on a network via a LAN cable.

In the preferred embodiment, Windows (registered trademark) is installed on the personal computer 1 as the operating system. Since the various functions of the Windows operating system are well known in the art, a detailed description of these functions will not be described herein. However, the following description presupposes that the personal computer 1 possesses the various functions provided by Windows.

The printer 2 includes a CPU 20, a ROM 21, a RAM 22, a hard disk drive 23, operating keys 24, a display panel 25, a printer port interface 26, a LAN interface 27, a nonvolatile RAM 28, and a print unit 29.

The CPU 20 executes various calculations and control processes for controlling components in the printer 2 according to control programs stored in the ROM 21.

The ROM 21 is a storage device capable of saving stored contents when a power switch of the printer 2 is switched off. In addition to the control programs mentioned above, the ROM 21 stores various read-only data that is normally not updated.

The RAM 22 is a storage device employed as the main memory or the like directly accessed by the CPU 20. Various data generated through computations by the CPU 20 are temporarily stored in the RAM 22.

The hard disk drive 23 is a storage device for storing a large volume of data that cannot be stored in the RAM 22.

The operating keys 24 are input devices that the user operates manually to issue instructions to the printer 2.

The display panel 25 is configured of a small liquid crystal display that can display settings and status of the printer 2 and other data.

The printer port interface 26 is capable of connecting with a personal computer and has the same standard as the printer port interface 16 of the personal computer 1. For example, the printer port interface 26 may be configured of a serial interface such as the USB interface, or a parallel interface such as the IEEE 1284 interface.

The LAN interface 27 is an interface for communicating with a personal computer on a network via a LAN cable.

The nonvolatile RAM 28 is a storage device for storing variable settings related to the printer 2 and other data that is preferably not lost when the power to the printer 2 is switched off.

The print unit 29 is configured of a conveying mechanism for conveying a sheet-like medium such as a recording paper from a feeding section to a discharging section, a recording mechanism for recording images on the medium while the conveying mechanism conveys the medium along a conveying path, and the like.

The printer 3 includes a CPU 30, a ROM 31, a RAM 32, a hard disk drive 33, operating keys 34, a display panel 35, a printer port interface 36, a LAN interface 37, a nonvolatile RAM 38, and a print unit 39. The components constituting the printer 3 are identical to those in the printer 2 and, hence, a description of these components will not be repeated.

[Process for Renaming Virtual Devices]

Figure 2:
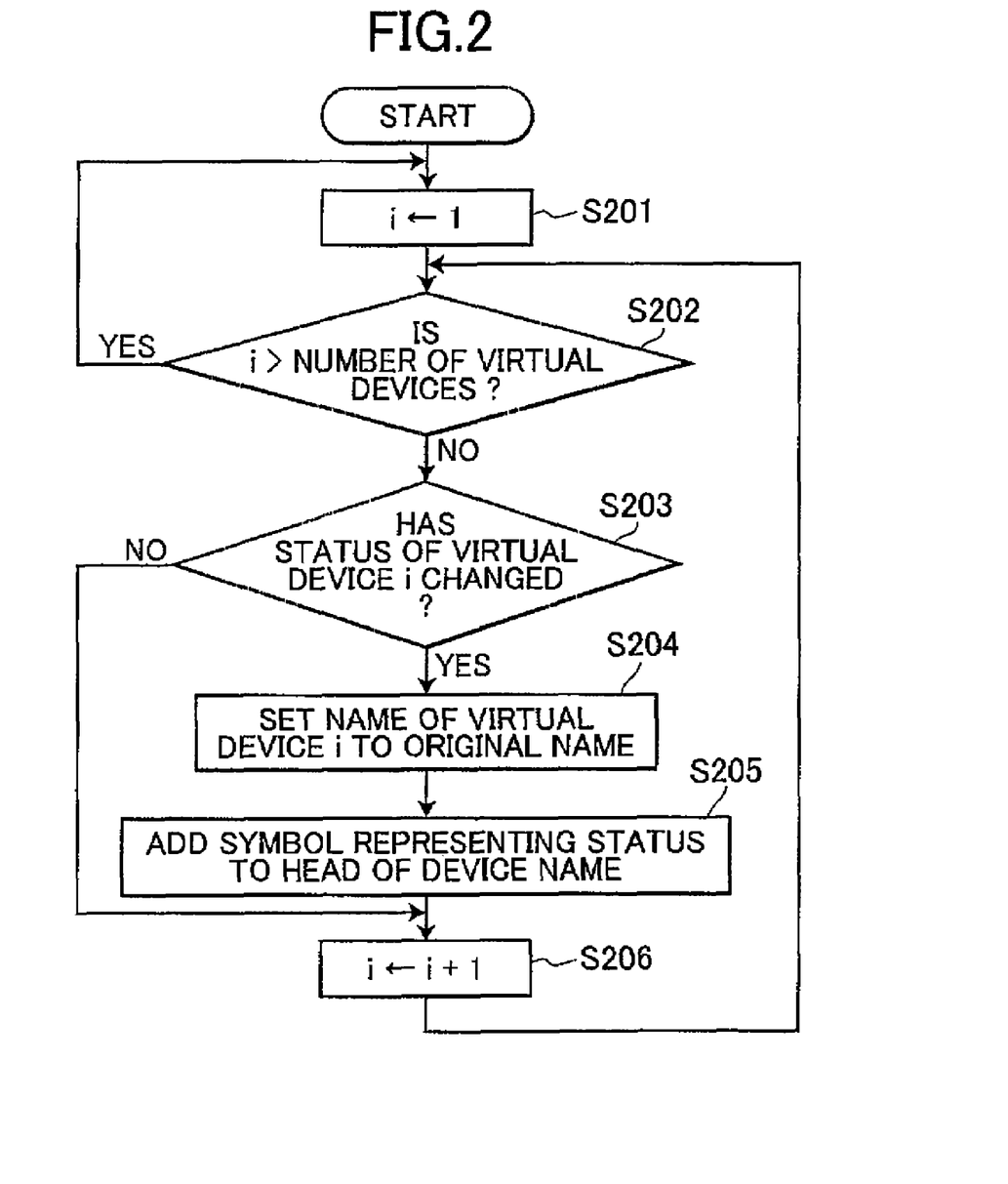
FIG. 2 is a flowchart illustrating steps in the virtual device renaming program according to the preferred embodiment of the present invention.

Next, the process for renaming virtual device executed by the CPU 10 in the personal computer 1 will be described with reference to the flowchart in FIG. 2. While there is no particular restriction on the timing at which this process is started, the process in the preferred embodiment is configured as a resident process that begins executing when the personal computer 1 is started.

Figure 3:
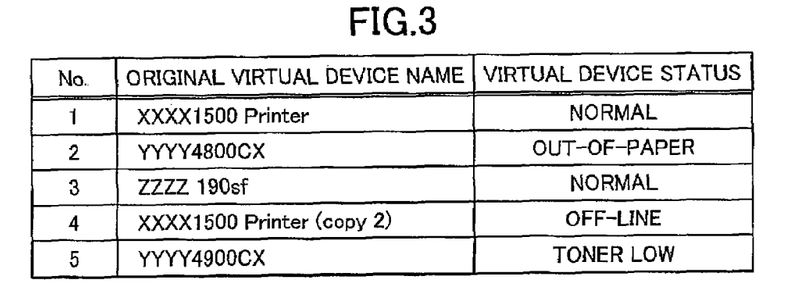
FIG. 3 is a table listing the names and status of virtual devices according to the preferred embodiment of the present invention.

The following description addresses a case in which five virtual devices shown in FIG. 3 have been installed in the personal computer 1. That is, the personal computer 1 is capable of using five printers. When each printer driver is installed on the personal computer 1, the name of the printer driver, the name of a file storing the printer driver program, and the like are registered in a registry (storage area managed by the operating system) of the personal computer 1. This process is equivalent to installing a virtual device on the personal computer 1. Thereafter, when an application program outputs print data, the user can specify a virtual device registered in the personal computer 1 as the output destination in order to output the print data to the printer corresponding to that virtual device. In selecting a virtual device as the output destination, the user views names of the virtual devices and selects a desired device. Here, the names of the virtual devices viewed by the user are the names of printer drivers registered in the registry.

In the following description, the status of the five virtual devices (that is, the status of printers corresponding to these virtual devices) will be treated as that shown in FIG. 3.

At the beginning of the process for renaming virtual device in S201, the CPU 10 first initializes a counter i to 1. In S202 the CPU 10 determines whether i is greater than the number of virtual devices. Since there are five virtual devices in the example of the preferred embodiment, in the process of S202 the CPU 10 compares the value stored in the counter i to 5. At this point of the description, the counter i has just been initialized in the process of S201 and, therefore, is not greater than 5 (S202: NO). In this case, the CPU 10 advances to S203.

In S203 the CPU 10 determines whether the status of the $i^{th}$ virtual device shown in FIG. 3 has changed. Here, any method may be used in S203 to extract the status of the virtual device. For example, the CPU 10 may activate a resident process for acquiring data indicating the status of the virtual device from the printer corresponding to that virtual device and may acquire the status of the virtual device in S202 by the inter-process communication. Alternatively, the resident process may be configured to write data corresponding to the status of the virtual device to a file each time the data is acquired from the printer, enabling the CPU 10 to read the data from this file. Alternatively, the CPU 10 may directly acquire data from the printer corresponding to the virtual device in S203 by executing a process similar to the resident process. A suitable method of acquiring the status of virtual devices may be selected from these methods with consideration for the system scale, processing rate, convenience, required costs, and the like.

If the status of the $i^{th}$ virtual device has changed (S203: YES), then in S204 the CPU 10 sets the $i^{th}$ virtual device shown in FIG. 3 as the target virtual device and initializes the device name of the target virtual device to the original virtual device name. For example, if the value stored in the counter i is 2, then the virtual device name after initialization is "YYYY4800CX."

In S205 the CPU 10 adds a symbol to the head of the virtual device name indicating the status of the $i^{th}$ virtual device. The symbol added to the head of the virtual device name is determined from a table, such as that shown in FIG. 4, stored in the registry of the personal computer 1. Each symbol includes two digits that indicate the status of the device. A "0" or a "5" in the leading digit indicates a normal status, while a "9" indicates an abnormal status. While indicating a normal status, a "5" in the first digit also indicates a caution state. If the leading digit is a "5" or a "9", the second digit is modified according to the cause of the caution state or abnormal state, and a character string describing this cause (such as "paper low") is also included in the name.

One of the symbols described above is attached to the head of the virtual device name based on the status of the $i^{th}$ virtual device. As a result, the names of each virtual device in the states shown in FIG. 3 are changed to the "modified virtual device name" shown in FIG. 5. For example, when the value stored in the counter i variable is 2 and the second virtual device is out of paper, the modified virtual device name of the second virtual device is set to "90 out-of-paper-YYYY4800CX."

The CPU 10 advances to S206 after completing the process in S205, or by skipping the processes in S204 and S205 when the status of the $i^{th}$ virtual device has not changed (S203: NO). In S206 the CPU 10 increments the counter i by 1 and subsequently returns to S202. By looping back in this way, the processes in S202-S206 are repeated for each of the virtual devices. Upon returning to S202 after repeating the processes of S202-S206 for the number of virtual devices, the counter i is now greater than the number of virtual devices (S202: YES), indicating that the process has been completed for all virtual devices. Accordingly, the CPU 10 returns to S201.

Thereafter, the CPU 10 performs the loop process of S202-S206 again from the beginning, monitoring changes in the status of the virtual devices in S203. The CPU 10 executes the processes in S204 and S205 when a change in status occurs.

Figure 5:
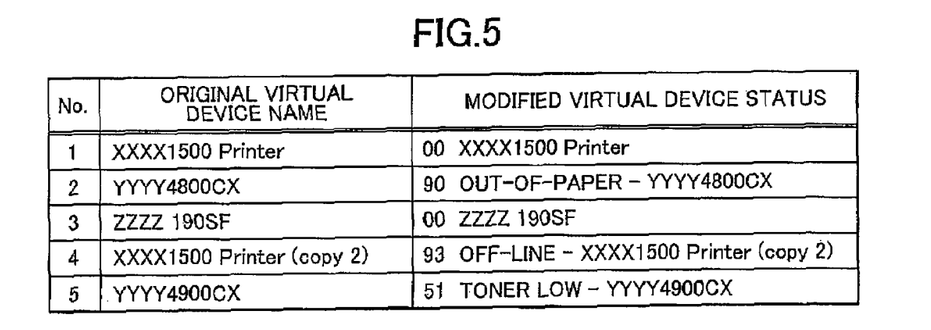
FIG. 5 is a table listing the original names and modified names of the virtual devices according to the preferred embodiment of the present invention.

As a result of performing the process for renaming virtual devices described above, the names of the virtual devices registered in the personal computer 1 are modified as shown in FIG. 5. The "modified virtual device names" shown in FIG. 5 are displayed when prompting the user to select a virtual device.

Figure 6:
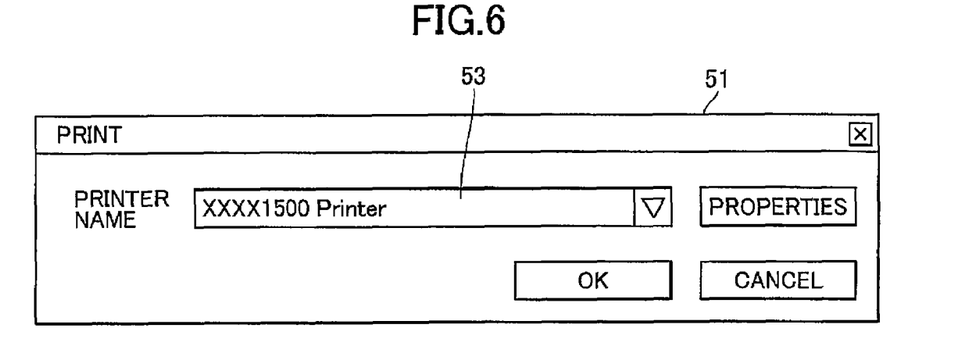
FIG. 6 is an explanatory diagram showing a Print dialog box according to the preferred embodiment of the present invention.

More specifically, when the user performs a prescribed operation in order to use the printer function of an application program, for example, a Print dialog box 51, such as that shown in FIG. 6, is displayed on the display unit 15 of the personal computer 1. A list box 53 is provided in the Print dialog box 51 for allowing the user to select a desired virtual device. When the Print dialog box 51 is first displayed, the currently selected virtual device name is displayed in the list box 53.

Figure 7:
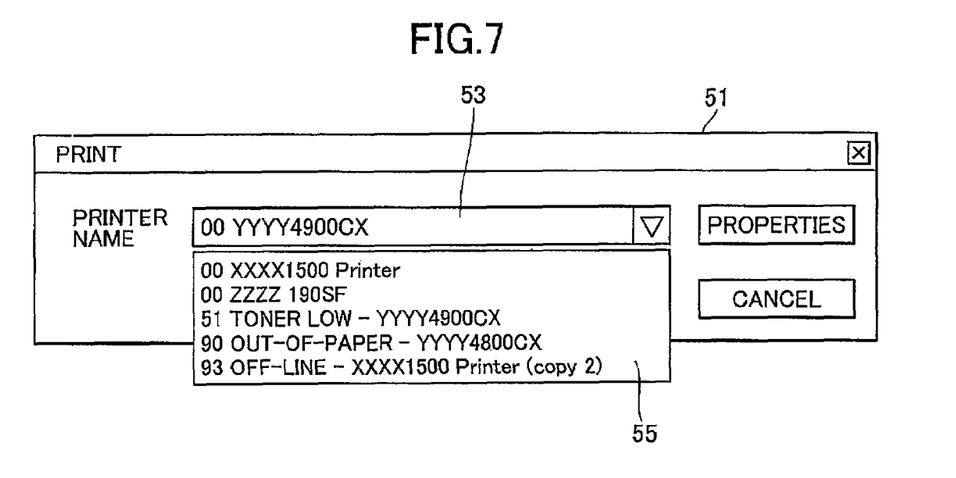
FIG. 7 is an explanatory diagram showing the Print dialog box when a list box has been opened therein according to the preferred embodiment of the present invention.

If the user wishes to select a different virtual device, the user operates a pointing device to click on the mark on the right end of the list box 53 (or performs keyboard operations or the like set as an equivalent function). This operation displays a list 55 near the list box 53 (directly below the list box 53 in the present example), as shown in FIG. 7.

The list 55 includes a list of names for a plurality of alternative virtual devices. Here, the virtual device names are ordered by character code according to the specifications of the Windows OS. As shown in FIG. 5, the virtual device names have been modified by adding the symbol shown in FIG. 4 to the head of the original virtual device name. As a result, the names of properly working virtual devices are arranged in the top of the list 55 shown in FIG. 7 due to the "00" added to the head of the name.

The names of properly working virtual devices are followed by names of virtual devices in a caution state to the head of which has been added "5x" (where x is either 0 or 1), and subsequently by names of virtual devices in an abnormal state to the head of which names has been added "9x" (where x is an integer between 0 and 3). Hence, the user can easily select a virtual device that is currently in a normal state.

EFFECTS OF THE INVENTION

As described above, the personal computer 1 executes a process to rename the virtual devices, modifying the names of the devices according to their status. Hence, when the personal computer 1 displays a plurality of names of virtual devices for the user, the user can select a virtual device in a desired state by referencing the list of names.

Therefore, when there exists a number of virtual devices other than the default device that can be selected as the output destination, the user selects a virtual device in a state capable of printing by viewing the list of virtual device names, even when the list of virtual devices includes devices that are incapable of printing.

Further, since both numerals representing the status of the virtual device and a character string representing the status of the virtual device are included in the modified virtual device name, the user can learn the status of the virtual device by looking at either the numerals or the character string. Moreover, since the numerals representing the status of the virtual device are added at the head of the device name, the modified names of virtual devices are displayed in an order that groups virtual devices of the same state together. Therefore, the user can more easily find a section of the display including a group of virtual devices of the desired status than when virtual devices of various statuses are mixed in the display, aiding the user in selecting a virtual device in the desired state.

Further, the numerals representing the status of the virtual device are set smaller as the device nears a normal status. Hence, since the personal computer 1 displays the virtual device names in order of their character codes according to the function of the operating system, virtual devices in a normal state are listed at the top, while virtual devices in an abnormal state are listed on the bottom. Accordingly, unlike the method of simply displaying virtual devices of the same status together, this method enables the user to select virtual devices in a normal state more easily by browsing virtual device names at the top of the list.

Further, the numerals representing the status of the virtual devices are set so that the user can distinguish whether the virtual device is operating normally or abnormally, and whether the virtual device is in a caution state if operating normally, simply by viewing the first digit. Therefore, when viewing the virtual device names, the user can learn whether the status of the virtual device is normal or abnormal and, when normal, whether the virtual device is in a caution state.

Further, the personal computer 1 can modify the virtual device name if the status of at least one virtual device changes, modifying the virtual device name to a name reflecting the new status.

While the invention has been described in detail with reference to specific embodiments thereof, it would be apparent to those skilled in the art that many modifications and variations may be made therein without departing from the spirit of the invention, the scope of which is defined by the attached claims.

For example, while the modified virtual device names in the preferred embodiment are configured by adding both a numeral representing the status of the virtual device (00, 50, 51, 90, 91, 92, and 93) and a character string representing the status of the virtual device (normal, paper low, toner low, out-of-paper, out-of-toner, power off, and off-line), it is possible to add only one of these instead.

Specifically, it is possible to add only numerals representing the status of the virtual device. By adding the numerals at the head of the virtual device name in this case, the names of virtual devices in the same state are grouped together when listing a plurality of the virtual device names for the user to select a virtual device. Hence, the user can easily select a virtual device having the desired status. In this case, the user determines the status of the virtual device by referring to the numerals.

Similarly, it is possible to add only a character string representing the status of the virtual device, such as a normal, paper low, toner low, out-of-paper, out-of-toner, power off, and off-line status. By adding the character string to the head of the virtual device name in this case, virtual devices having the same status are grouped together when listing a plurality of the virtual device names for prompting the user to select a virtual device. However, while the names of virtual devices having the same status are grouped together when such character strings are attached, the order of groups depends on the character codes of the attached character strings. Hence, while the status of the virtual devices can be readily understood from the character strings, the groups of virtual devices may not be arranged in a desired order when attaching only such character strings.

From this perspective, adding the numerals to the head of the virtual device names ensures that the virtual device names are arranged in a desired order, while adding a character string directly after the numerals indicates the status of the virtual device more clearly than the numerals, thereby optimizing the order and improving understanding.

It is also possible to add a character string representing the status of the virtual device after the original virtual device name when the numerals are added to the head of the name for arranging the virtual device names in a desired order. Adding the character string to the end of the virtual device name has no particular effect on the order. If the user does not care about the order in which the virtual device names are displayed, the numerals and character strings representing the status of the virtual devices may be added anywhere in the name. In this case, the user can still determine the status of a virtual device simply by referring to the virtual device name.

Figure 4:
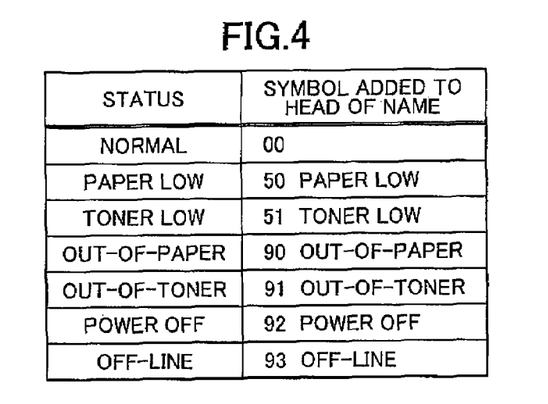
FIG. 4 is a table listing the status of the virtual devices and the corresponding numerals added to the names of the virtual devices according to the preferred embodiment of the present invention.

Further, the preferred embodiment uses the two-digit numerals shown in the example of FIG. 4 as a character string attached to the head of the virtual device names. Here, the correlation between character strings including such numerals (or letters or symbols in place of the numerals) and the status of the virtual devices may be predetermined and unchangeable or may be variable, allowing the user to modify the correlations as desired. For example, the user can modify the correlations as desired from "90=out-of-paper," "91=out-of-toner," and "92=power off" in the above example to "90=power off," "91=out-of-paper," and "92=out-of-toner." By modifying the correlations, the user can adjust the priority for displaying virtual device names to a desired order. Hence, a user can place emphasis on displaying virtual devices that are out of paper by associating smaller numerals (hereinafter, smaller numerals may also indicate letters or symbols having a lower character code) to the out-of-paper status, and can place priority on displaying virtual devices in the power off state by associating smaller numerals with the power off status, thereby displaying virtual device names in an order that is most convenient for each user.

Further, in the preferred embodiment described above, virtual devices are broadly divided into three groups, i.e., virtual devices operating normally and not in a caution state, virtual devices operating normally in a caution state, and virtual devices operating abnormally, by using the numerals "0", "5", and "9" in the first digit of the character array added to the head of the virtual device name. However, it should be apparent that these groups can be divided using characters other than "0", "5", and "9". For example, in place of "0", "5", and "9", it is possible to use "1", "2", and "3", or characters other than numerals, such as "A", "B", and "C". Alternatively, the portion of the character string corresponding to "0", "5", and "9" may be configured of two or more characters from a functional perspective. For example, the first two characters of the character string may be set to "0A" when the status of the virtual device is normal with no caution, "0B" when the status is normal with caution, and "1C" when the status is abnormal. In this example, "0A" and "0B" are sorted according to the second character, while "1C" is sorted with respect to "0A" and "0B" according to the first character. This method applies the order "0A", "0B", and "1C" to the virtual device names, similar to the order "0", "5", and "9" described above.

What is claimed is:

1. A data processing device comprising:
a processor;
memory configured to store instructions that, when executed by the processor, cause the processor to provide functional units including:
a registering unit that registers a plurality of communicable printers as a plurality of virtual devices;
a status acquiring unit that acquires a status of each of the plurality of virtual devices; and
a virtual device renaming unit that changes at least one of the virtual device names for the plurality of virtual devices to a device name representing the status of a corresponding virtual device acquired by the status acquiring unit, the virtual device renaming unit adding a character string to a head of the virtual device name to provide a modified virtual device name, the character string representing the status of the virtual device acquired by the status acquiring unit, and
a display unit that displays the virtual device names and the modified virtual device name in a character code order of the character string.

2. The data processing device according to claim 1, wherein the virtual device renaming unit comprises:
a status determining unit that determines whether the status of each of the plurality of virtual devices is normal or abnormal; and
the adding performed by the virtual device renaming unit includes adding a first character string to the virtual device name of the virtual device determined to be normal by the status determining unit and a second character string to the virtual device name of the virtual device determined to be abnormal by the status determining unit, the first character string being different from the second character string.

3. The data processing device according to claim 2, wherein the status determining unit further determines whether each of the plurality of virtual devices whose status acquired by the status acquiring unit is determined to be normal is in a caution state; and
the virtual device renaming unit adds a third character string to the virtual device name of the virtual device determined to be in the caution state by the status determining unit, the third character string being different from the first character string and the second character string.

4. The data processing device according to claim 2, wherein
the adding performed by the virtual device renaming unit adds the first character string to the head of the virtual device name determined to be normal and the second character string to a head of the virtual device name determined to be abnormal such that the virtual device name including the first character string is displayed by the display unit in a higher position than the virtual device name including the second character string when the display unit displays the plurality of virtual device names according to the character code order.

5. The data processing device according to claim 4, wherein each of the first character string and the second character string is composed of a numeral of at least one digit.

6. The data processing device according to claim 1, wherein the virtual device renaming unit changes the virtual device name when there is a change in the status acquired by the status acquiring unit for at least one of the plurality of virtual devices.

7. A non-transitory computer readable medium containing a virtual device renaming program for instructing a data processing device, the data processing device including a processor and memory storing instructions that, when executed by the processor, cause the data processing device to register a plurality of communicable printers as a plurality of virtual devices, to display and sort the virtual device names and the modified virtual device name to be arranged in a character code order of the character string, to prompt a user to select one of the plurality of virtual devices, and to transmit print data to a printer corresponding to a selected virtual device, the virtual device renaming program that, when executed, causes the processor to perform steps comprising:
acquiring a status of each of the plurality of virtual devices; and
renaming at least one of the virtual device names for the plurality of virtual devices to a device name representing the status of a corresponding virtual device acquired in the acquiring step, wherein the renaming includes adding a character string to a head of the virtual device name to provide a modified virtual device name, the character string representing the status of the virtual device acquired in the acquiring step.

8. The non-transitory computer readable medium containing the virtual device renaming program according to claim 7, wherein the renaming step comprises:
determining whether the status of each of the plurality of virtual devices acquired in the acquiring step is normal or abnormal; and
the adding step includes adding a first character string to the virtual device name of the virtual device determined to be normal in the determining step and a second character string to the virtual device name of the virtual device determined to be abnormal in the determining step, the first character string being different from the second character string.

9. The non-transitory computer readable medium containing the virtual device renaming program according to claim 8, wherein the determining step includes determining whether each of the plurality of virtual devices whose status acquired in the acquiring step is determined to be normal is in a caution state; and
the renaming step includes adding a third character string to the virtual device name of the virtual device determined to be in the caution state in the determining step, the third character string being different from the first character string and the second character string.

10. The non-transitory computer readable medium containing the virtual device renaming program according to claim 8, wherein the adding in the renaming step includes adding the first character string to the head of the virtual device name determined to be normal and the second character string to a head of the virtual device name determined to be abnormal such that the virtual device name including the first character string is displayed in a higher position than the virtual device name including the second character string when the data processing device displays and sorts the virtual device names according to the character code order.

11. The non-transitory computer readable medium containing the virtual device renaming program according to claim 10, wherein each of the first character string and the second character string is composed of a numeral of at least one digit.

12. The non-transitory computer readable medium containing the virtual device renaming program according to claim 7, wherein the renaming step is executed when there is a change in the status acquired in the acquiring step for at least one of the plurality of virtual devices.

* * * * *